United States Patent
Sato

(10) Patent No.: US 7,262,813 B2
(45) Date of Patent: Aug. 28, 2007

(54) VIDEO OUTPUT DEVICE AND METHOD

(75) Inventor: Takeshi Sato, Saitama (JP)

(73) Assignee: Alpine Electronics, Inc., Tokyo (JP)

( * ) Notice: Subject to any disclaimer, the term of this patent is extended or adjusted under 35 U.S.C. 154(b) by 538 days.

(21) Appl. No.: 10/901,559

(22) Filed: Jul. 29, 2004

(65) Prior Publication Data
US 2005/0041164 A1 Feb. 24, 2005

(30) Foreign Application Priority Data
Aug. 1, 2003 (JP) .............................. 2003-284690

(51) Int. Cl.
*H04N 5/44* (2006.01)
(52) U.S. Cl. .................................................... 348/602
(58) Field of Classification Search ................ 348/602, 348/604, 739, 552, 553; 315/316
See application file for complete search history.

(56) References Cited

U.S. PATENT DOCUMENTS

| | | | | |
|---|---|---|---|---|
| 4,367,464 A * | 1/1983 | Kurahashi et al. | ............ | 345/22 |
| 5,282,121 A * | 1/1994 | Bornhorst et al. | ........... | 362/294 |
| 6,166,496 A * | 12/2000 | Lys et al. | .................... | 315/316 |
| 6,611,297 B1 * | 8/2003 | Akashi et al. | .............. | 348/739 |
| 6,819,306 B1 * | 11/2004 | Cooper | ........................ | 345/22 |
| 7,161,311 B2 * | 1/2007 | Mueller et al. | .............. | 315/294 |
| 2005/0041161 A1 * | 2/2005 | Dowling et al. | ............. | 348/739 |

* cited by examiner

*Primary Examiner*—Paulos M. Natnael
(74) *Attorney, Agent, or Firm*—Brinks Hofer Gilson & Lione

(57) ABSTRACT

A video output device includes a signal converter for generating a video signal corresponding to displayed video; a projector and a main screen for displaying the video based on the video signal output from the signal converter; left and right lighting units, a left screen, and a right screen disposed in the vicinity of the main screen; and a feature extractor, a left-lighting setting unit, and a right-lighting setting unit for controlling lighting modes of the left and right lighting units based on the content of the displayed video in synchronization with the display timing of the video.

26 Claims, 8 Drawing Sheets

VIDEO OUTPUT DEVICE AND METHOD

BACKGROUND OF THE INVENTION

1. Field of the Invention

The present invention relates to a video output device and a method for displaying video with a projector.

2. Description of the Related Art

Multi-screen displays that can provide a super-high-resolution big screen consisting of multiple screens providing a sense of presence are known (refer to, for example, Japanese Unexamined Patent Application Publication No. 2002-107831, in particular, pages 4 to 7 and FIGS. 1 to 13). In such multi-screen displays, four projectors are arranged closely by placing two projectors side by side in the vertical direction and the horizontal direction, in the vicinity of the center of the screen at a distance from its back side. Thus, by disposing a plurality of projectors at the center of a screen on its back side, a big screen that provides a sense of presence can be achieved without increasing the directivity of the screen.

Unfortunately, although the multi-screen display disclosed in the above-described publication can provide a big screen with a sense of presence by using a plurality of projectors, the multi-screen display requires a plurality of projectors to display one scene of video and also assignment of each part of the scene to the corresponding projector. This process is disadvantageously complicated, thereby increasing the cost of the device.

Recently, big-screen displays such as liquid crystal displays and plasma displays using plasma discharge have been put into practical use and, therefore, big screens providing a sense of presence are easily available. However, these displays are quite expensive. Low-cost video output devices that can display video providing a sense of presence are expected to be available.

SUMMARY OF THE INVENTION

Accordingly, it is an object of the present invention to provide a low-cost video output device that can produce video images providing a sense of presence.

According to the present invention, a video output device includes a video signal generation unit for generating a video signal corresponding to displayed video; a display unit for displaying the video based on the video signal output from the video signal generation unit; lighting units disposed in the vicinity of the display unit; and a lighting control unit for controlling a lighting mode of each lighting unit based on the content of the displayed video in synchronization with the display timing of the video. In general, the human eye cannot perceive details of an image if the image is at the sides of the viewing angle range, and only senses the brightness and color of the image as an ambience. Accordingly, by disposing the lighting units in the vicinity of the display unit and controlling a lighting mode of each lighting unit in synchronization with the content of the video displayed on the display unit, video images having the same sense of presence provided by enlarging a screen of the display unit can be achieved. Additionally, the effective video display area of the display unit can be reduced and, therefore, the cost is reduced.

Preferably, the video signal generation unit generates the video signal corresponding to the displayed video composed of a plurality of temporally successive frames and the lighting control unit sets up a lighting mode in accordance with the content of each frame. By controlling the lighting mode in synchronization with the content of the frames that constitute the displayed video, a video image corresponding to each frame can provide the same visual effect provided by a larger displayed video image and, therefore, video providing a sense of presence can be achieved.

Preferably, the lighting units define predetermined lighting zones on left and right sides of a display screen of the display unit. By defining the predetermined lighting zones on left and right sides of the display unit, a sense of presence can be increased in the horizontal direction. In particular, since the viewing angle of the human eye in the horizontal direction is wider that that in the vertical direction, the sense of presence provided by the video can be significantly increased by disposing the lighting areas in the horizontal direction.

Preferably, the display unit has a display screen disposed within the normal viewing angle range of an observer of the displayed video, and the lighting zone of the lighting unit is disposed outside the normal viewing angle range of the observer. In general, the human eye can perceive details of an image within the normal viewing angle range, whereas the human eye cannot perceive details of the image displayed outside the normal viewing angle range. Accordingly, by replacing the actual image in the unrecognizable zones with lighting from the lighting units, displayed video has a strong visual effect which is the same as that of a bigger screen including the lighting zones.

Preferably, the lighting zone of the lighting unit is disposed within the maximum viewing angle range of the observer. The observer cannot even perceive color and brightness outside the maximum viewing angle range. Therefore, eliminating lighting of such zones limits the lighting zone required for increasing the sense of presence, thus reducing the power consumption and size of a facility.

Preferably, the lighting control unit analyzes the content of the displayed video corresponding to the frame and sets up the lighting mode of the lighting unit. This process allows an appropriate lighting mode for each frame of the video to be set up and, therefore, a sense of presence provided by the video can be increased by the lighting.

Preferably, the frame comprises a plurality of areas, and the lighting control unit extracts a feature from each area and sets up the lighting mode of the lighting unit by using the feature. More specifically, the lighting control unit preferably sets up the lighting mode of the lighting unit by weighting the features in a predetermined manner and adding the weighted features. This process allows the content of the video corresponding to each frame to be easily analyzed.

Preferably, the weighting is determined such that an area closer to the lighting unit has a higher weighting factor. Accordingly, the content of the displayed video closer to the lighting zone has more influence on the lighting mode and, therefore, a feeling of strangeness caused by a difference between the displayed video and the lighting in the periphery of the video can be eliminated.

Preferably, the video output device further includes a timing adjuster for synchronizing a display timing of the displayed video corresponding to one of the frames with a lighting timing of the lighting unit. More specifically, the timing adjuster is preferably connected upstream of at least one of the display unit and the lighting unit so as to function as a delay unit for delaying the display timing or the lighting timing, whichever comes first, to synchronize the display timing with the lighting timing. Consequently, the timing adjuster can adjust a difference between the time required for generating a video signal and the time required for analyzing the content of the displayed video and controlling the lighting mode based on the analysis.

Preferably, the display unit includes a screen and a projector. By including a screen and a projector, displayed video that supports a big screen is easily achieved. In addition, by adding auxiliary lighting by the lighting units, observers can experience a greater sense of presence than that from the actual screen size. In known devices, a plurality of projectors is required to display video providing the same sense of presence. In this display device, however, the number of projectors can be reduced to one since the display area for the video can be reduced. Accordingly, the cost of the display device can be significantly reduced.

Preferably, the lighting unit is mounted on a chassis for supporting the display unit. Alternatively, the video output device further includes a speaker for producing sounds corresponding to the content of the displayed video, and the lighting unit is preferably mounted on a chassis for accommodating the speaker. This structure facilitates the installation operation of a facility including the display unit and the lighting units.

Preferably, the lighting unit includes a projection light source capable of changing the RGB ratio in accordance with the displayed video. Accordingly, lighting modes that fit the contents of the video can be easily produced.

Preferably, partitions forming a space containing the display unit are disposed around the display unit, and the lighting units emit light to the partitions. Using the partitions, such as a wall surface, a floor surface, and a ceiling surface, allows the lighting units to emit light without the need for special screens.

Preferably, an auxiliary screen is disposed in an area including the lighting zone of the lighting unit in the periphery of the display unit, and the lighting unit emits light to the auxiliary screen. By using the auxiliary screen, intended color and brightness by the lighting units can be easily and reliably achieved.

Preferably, the lighting control unit enables the lighting of the lighting unit when the brightness of the displayed video at a predetermined time is greater than or equal to a predetermined value. Since an observer does not perceive or does not sense the effect of lighting under a certain intensity, the lighting may be carried out only for bright scenes, not for such dark scenes. Thus, a wasted process and wasted power consumption can be reduced.

According to the present invention, a method for producing video includes; generating a video signal corresponding to displayed video; displaying the video based on the video signal with a display unit; controlling a lighting mode based on the content of the displayed video in synchronization with the display timing of the video to cause a lighting unit to be driven. By disposing the lighting units in the vicinity of the display unit and controlling the lighting modes in synchronization with the content of the video displayed on the display unit, video images having the same sense of presence provided by enlarging a screen of the display unit can be achieved. Additionally, the effective video display area of the display unit can be reduced and, therefore, the cost is reduced.

Preferably, the display unit has a display screen disposed within the normal viewing angle range of an observer of the displayed video, and the lighting zone of the lighting unit is disposed outside the normal viewing angle range and within the maximum viewing angle range of the observer. By replacing the actual image in the unrecognizable zones with lighting from the lighting units, displayed video has a strong visual effect which is the same as that of a bigger screen including the lighting zones. Additionally, the observer cannot even perceive color and brightness outside the maximum viewing angle range. Therefore, eliminating lighting of such zones limits the lighting zone required for increasing a sense of presence, thus reducing the power consumption and size of a facility.

DETAILED DESCRIPTION OF THE PREFERRED EMBODIMENTS

A video output device according to an embodiment of the present invention will now be described in detail with reference to the accompanying drawings.

Figure 1:
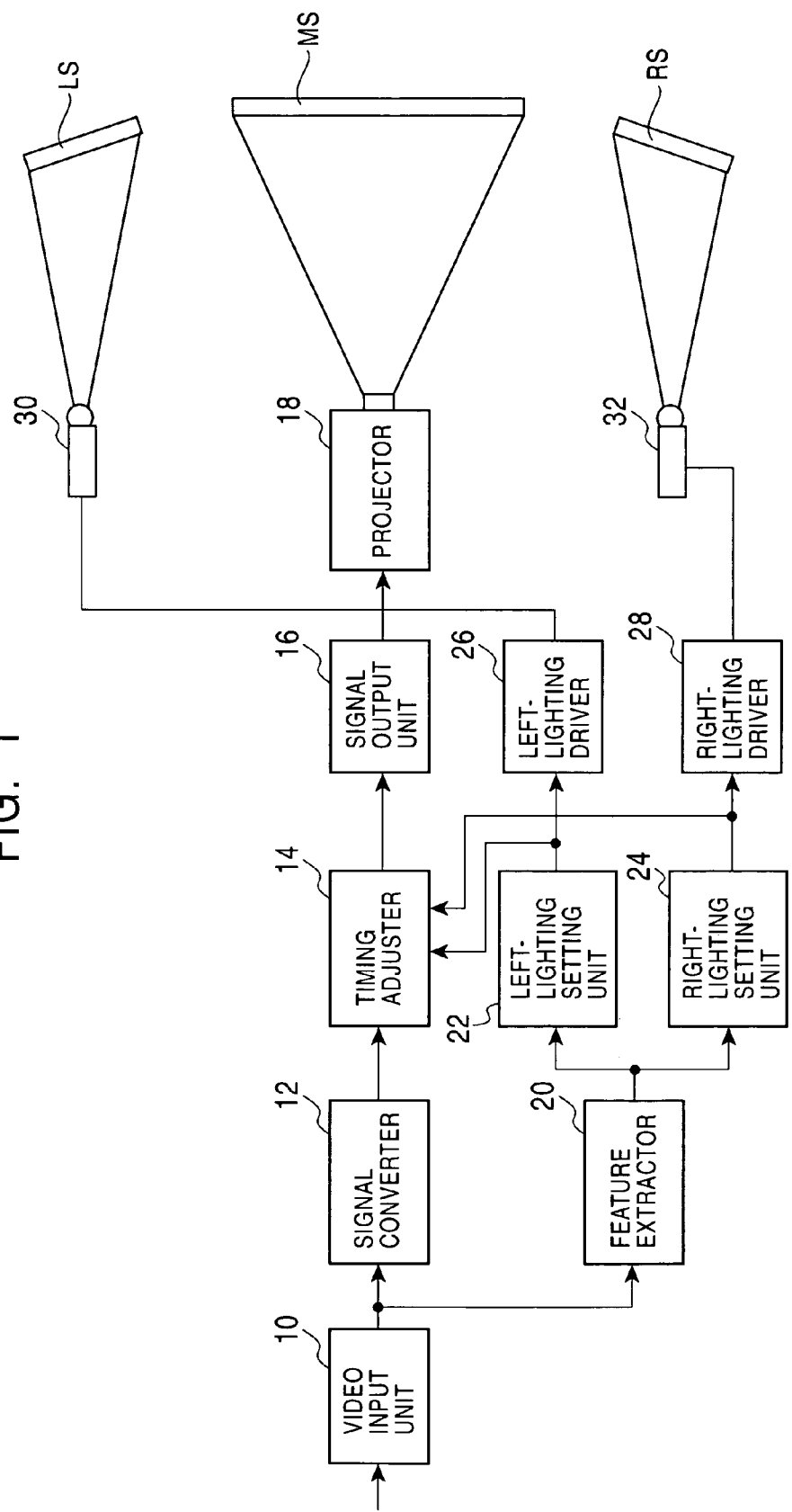
FIG. 1 is a block diagram of a video output device according to an embodiment.

FIG. 1 is a block diagram of a video output device according to the embodiment. As shown in FIG. 1, the video output device according to the embodiment includes a video input unit 10, a signal converter 12, a timing adjuster 14, a signal output unit 16, a projector 18, a feature extractor 20, a left-lighting setting unit 22, a right-lighting setting unit 24, a left-lighting driver 26, a right-lighting driver 28, a left lighting unit 30, and a right lighting unit 32. In front of the projector 18, a main screen MS is disposed. In front of the left lighting unit 30 and the right lighting unit 32, a left screen LS and a right screen RS are disposed, respectively.

The video input unit 10 adjusts a level of video signal received from another external device, and then delivers the adjusted video signal to both the signal converter 12 and the feature extractor 20. In the case where the level adjustment of video signal is not required, the video signal may be directly delivered to the signal converter 12 and the feature extractor 20.

The signal converter 12 converts the video signal to a format suitable for a projecting process of the projector 18. The timing adjuster 14 adjusts output timing for displaying video corresponding to the video signal from the projector 18. In this embodiment, although the timing adjuster 14 is connected downstream of the signal converter 12, the timing adjuster 14 may be connected upstream of the signal converter 12. Also, in this embodiment, the timing adjuster 14 is connected downstream of the signal converter 12 based on the assumption that, if the timing adjuster 14 is eliminated, the output timing for displaying video corresponding to the video signal by the projector 18 is earlier than that for lighting corresponding to the video signal output from the video input unit 10 by the left lighting unit 30 and the right lighting unit 32. However, in some cases, the timing of lighting is earlier since some formats of the input video signal require more processing time of the signal converter 12. In these cases, the timing adjuster 14 must be connected upstream or downstream of the feature extractor 20 or downstream of the left-lighting setting unit 22 and the right-lighting setting unit 24, all of which control lighting.

The signal output unit 16 outputs a video signal after the format conversion and the timing adjustment. The output video signal is input to the projector 18, which projects displayed video corresponding to temporally successive frames to the main screen MS.

The feature extractor 20 extracts features of a frame which constitutes displayed video corresponding to the video signal. For example, if a video signal including a luminance signal and a color signal is input, the feature extractor 20 extracts luminance data and color data for a pixel or a plurality of pixels that constitute each frame as features, and averages these features for every divided area of the frame.

The left-lighting setting unit 22 extracts the divided areas necessary for determining a lighting mode on the left side from all the divided areas of the frame. The average features for respective extracted areas are weighted by predetermined values and are added. The resultant value is used to set up a lighting mode for the left lighting unit 30. Weighting factors used for the addition are determined such that a divided area closer to the left side of the frame has a higher weighting factor.

Similarly, the right-lighting setting unit 24 extracts the divided areas necessary for determining a lighting mode on the right side from all the divided areas of the frame. The average features for respective extracted areas are weighted by predetermined values and are added. The resultant value is used to set up a lighting mode for the right lighting unit 32. Weighting factors used for the addition are determined such that a divided area closer to the right side of the frame has a higher weighting factor.

The left-lighting driver 26 drives the left lighting unit 30 so as to enter the lighting mode set by the left-lighting setting unit 22. Similarly, the right-lighting driver 28 drives the right lighting unit 32 so as to enter the lighting mode set by the right-lighting setting unit 24. For example, if the left and right-lighting setting units 22 and 24 set up luminance and color of the lighting as a lighting mode, the left lighting unit 30 and the right lighting unit 32 are driven to provide the luminance and color. Additionally, although the left lighting unit 30 and the right lighting unit 32 can be achieved by using high-luminance RGB LEDs or RGB lasers, any light source that can provide predetermined luminance and color may be used.

The above-described signal converter 12 corresponds to the video signal generation unit. The projector 18 and the main screen MS correspond to a display unit. The left lighting unit 30, the right lighting unit 32, the left screen LS, and the right screen RS correspond to the lighting unit. The feature extractor 20, the left-lighting setting unit 22, the right-lighting setting unit 24, the left-lighting driver 26, and the right-lighting driver 28 correspond to the lighting control unit. Additionally, the timing adjuster 14 corresponds to the timing adjusting unit. The left screen LS and the right screen RS also correspond to auxiliary screens.

Figure 2:
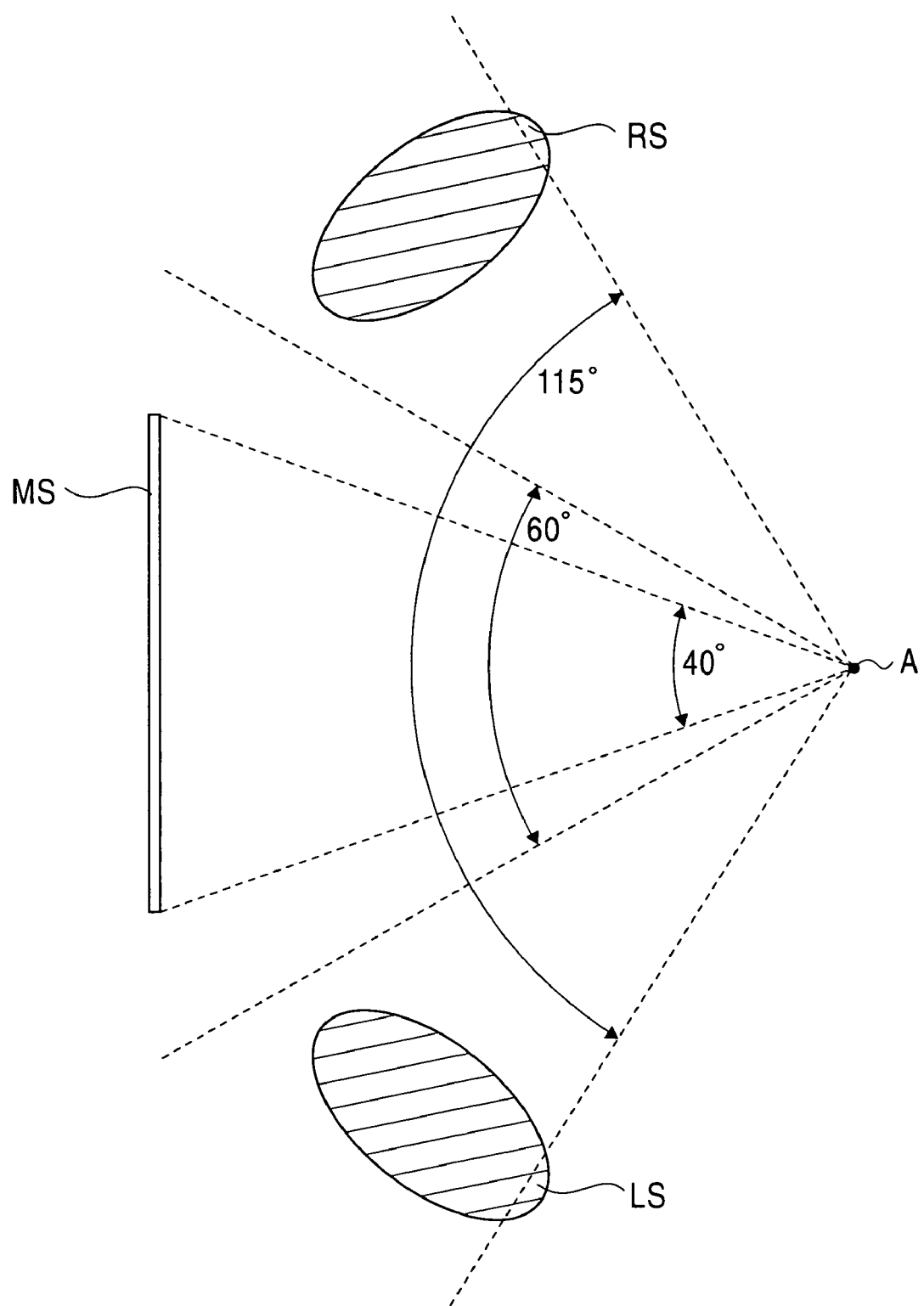
FIG. 2 is a diagram showing the relationship of a main screen, a left screen, and a right screen in the video output device according to the embodiment.

The video output device according to the embodiment has the above-described structure. The operation of the video output device will be described next. FIG. 2 shows the relationship among the main screen MS, the left screen LS, and the right screen RS in the video output device according to the embodiment. Reference symbol "A" in FIG. 2 denotes a viewing point of an observer who watches an image projected from the projector 18.

In general, the human eye can perceive details of an image only if the image is within a predetermined viewing angle. If the image is out of the viewing angle range, the human eye cannot perceive the details of the image and only senses the brightness and color as an ambience. The viewing angle range where the human eye can perceive details of an image is referred to as the "normal viewing angle", and the viewing angle range that exceeds the normal viewing angle and includes the range where the human eye can sense ambience is referred to as the "maximum viewing angle". Normally, the normal viewing angle is about 60° and the maximum viewing angle is about 115°. If an image is at an angle that exceeds the maximum viewing angle, the human eye cannot even sense the ambience of the image.

In this embodiment, the main screen MS is disposed within the range of the normal viewing angle of an observer who is at viewing point "A". In the example shown in FIG. 2, the main screen MS is disposed so as to cover about 40° viewing angle. The left screen LS and the right screen RS functioning as auxiliary screens are disposed such that most of their bodies are between the normal viewing angle and the maximum viewing angle, that is, in the viewing angle range of 60° to 115°.

Figure 3:
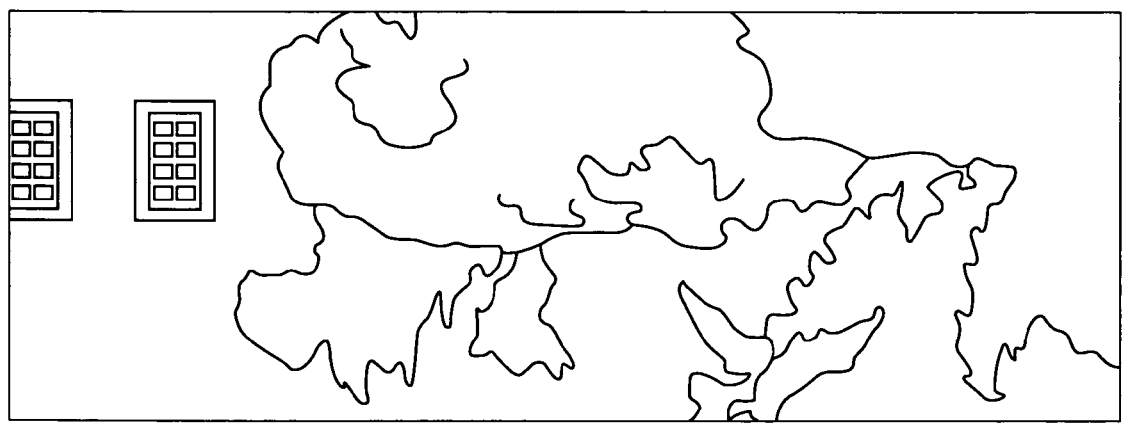
FIG. 3 shows an example of lighting modes of the left and right lighting units.
Figure 4:
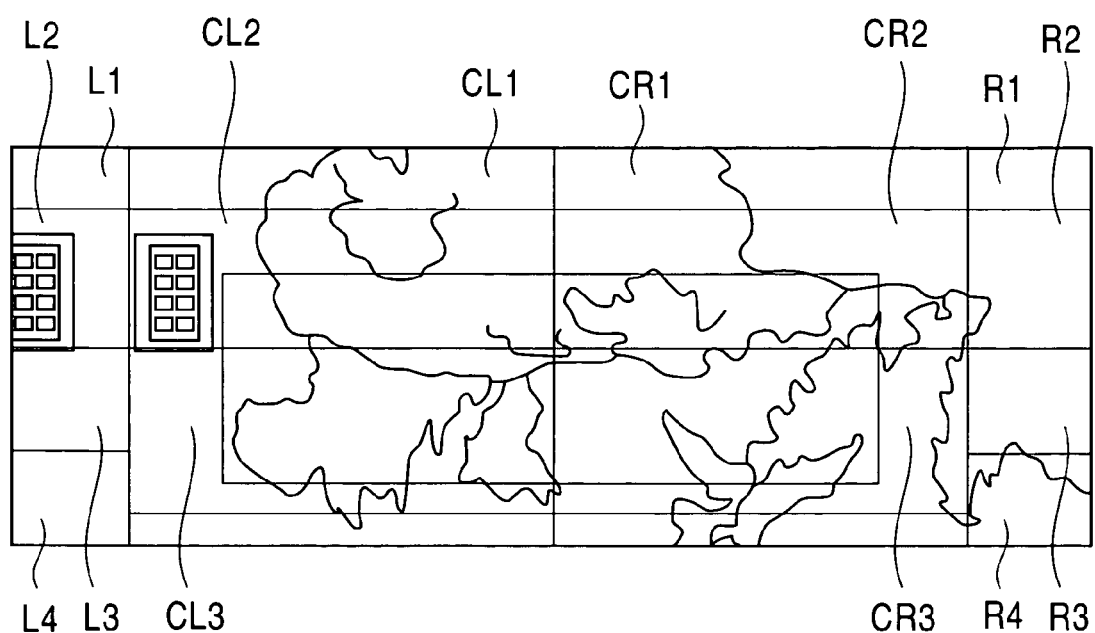
FIG. 4 shows another example of lighting modes of the left and right lighting units.
Figure 5:
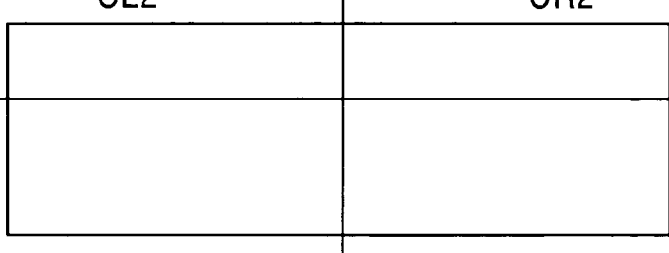
FIG. 5 shows another example of lighting modes of the left and right lighting units.

FIGS. 3 to 5 show an example of lighting mode settings of the left and right lighting units. As shown in FIG. 3, one frame of displayed video will be discussed below. The feature extractor 20 divides the frame, as shown in FIG. 4, and averages features for each divided area. For example, the feature extractor 20 averages luminance data and color data contained in each divided area, such as L1 or CL1. By this process, features corresponding to all the divided areas are computed, as shown in FIG. 5.

The left-lighting setting unit 22 extracts seven divided areas L1, L2, L3, L4, CL1, CL2, and CL3 from all the divided areas shown in FIG. 5 to determine a left lighting mode. The left-lighting setting unit 22 then sets up the lighting mode of the left lighting unit 30 by weighting the average features (luminance data and color data) for the corresponding divided areas with predetermined values and adding them. For example, if the weighting factors for the seven divided areas are a, b, c, d, e, f, and g, and the features for the areas are $X_{L1}$, $X_{L2}$, $X_{L3}$, $X_{L4}$, $X_{CL1}$, $X_{CL2}$, and $X_{CL3}$, the left-lighting setting unit 22 computes $aX_{L1}+bX_{L2}+cX_{L3}+dX_{L4}+eX_{CL1}+fX_{CL2}+gX_{CL3}$. Since the left screen LS, which is illuminated by the left lighting unit 30, is disposed on the left side of the main screen MS, the weighting factors a to d for the corresponding divided areas L1 to L4, which are areas in the left part of the frame, are set to be higher than the weighting factors e to g for the corresponding divided areas CL1 to CL3, which are areas in the center part of the frame. Therefore, the features of the left part of the frame have more influence on the left lighting mode.

Similarly, the right-lighting setting unit 24 extracts seven divided areas R1, R2, R3, R4, CR1, CR2, and CR3 from all the divided areas shown in FIG. 5 to determine a right lighting mode. The right-lighting setting unit 24 then sets up the lighting mode of the right lighting unit 32 by weighting the average features for the corresponding divided areas with predetermined values and adding them. For example, if the weighting factors for the seven divided areas are h, i, j, k, m, n, and p, and the features for the areas are $X_{R1}$, $X_{R2}$, $X_{R3}$, $X_{R4}$, $X_{CR1}$, $X_{CR2}$, and $X_{CR3}$, the right-lighting setting unit 24 computes $hX_{R1}+iX_{R2}+jX_{R3}+kX_{R4}+mX_{CR1}+nX_{CR2}+pX_{CR3}$. Since the right screen RS, which is illuminated by the right lighting unit 32, is disposed on the right side of the main screen MS, the weighting factors h to k for the corresponding divided areas R1 to R4, which are areas in the right part of the frame, are set to be higher than the weighting factors m to p for the corresponding divided areas CR1 to CR3, which are areas in the center part of the frame. Therefore, the features of the right part of the frame have more influence on the right lighting mode.

Figure 6:
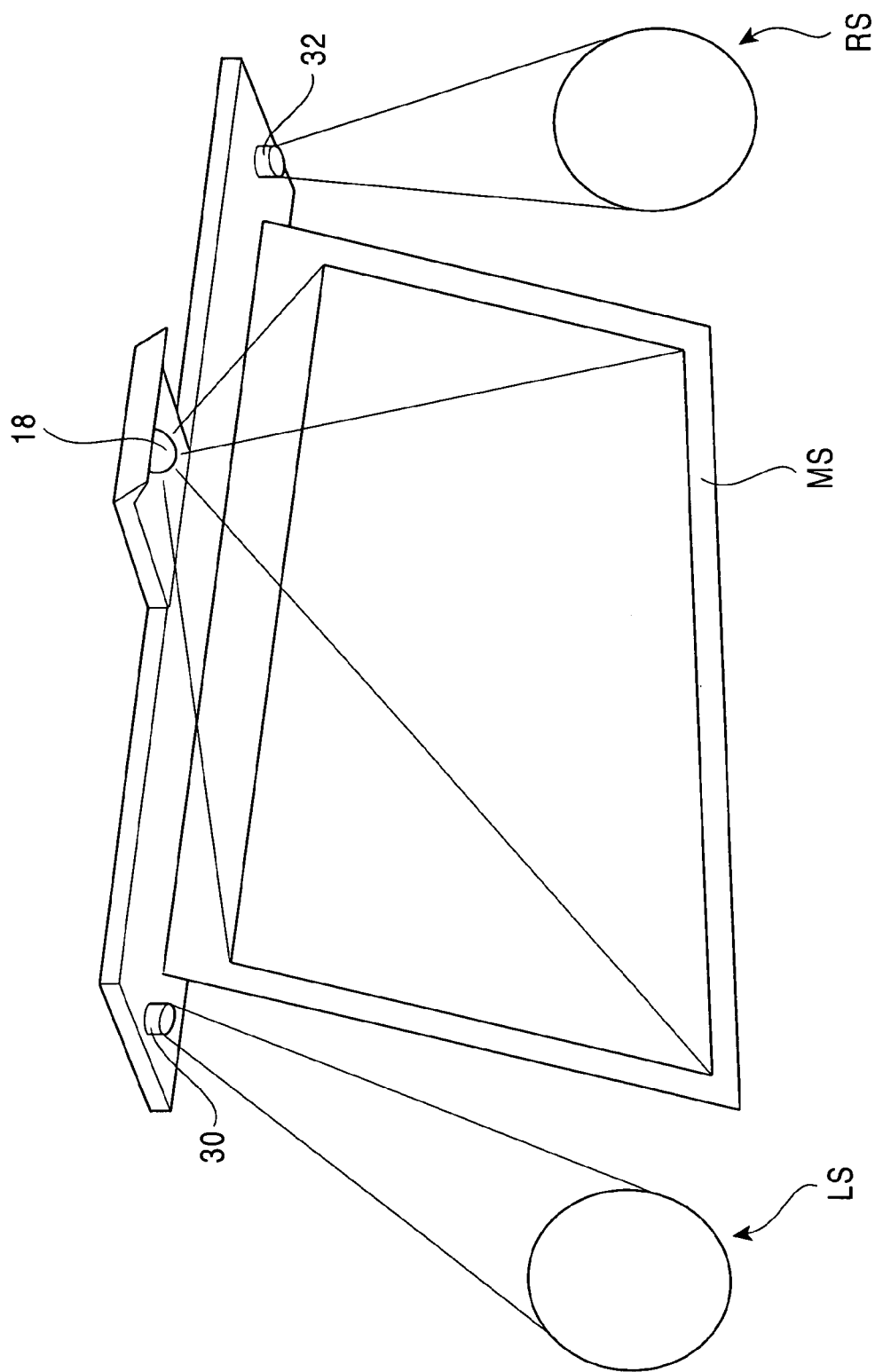
FIG. 6 shows an example in which the video output device according to the embodiment is installed in a room of a building.

FIG. 6 shows an example in which the video output device according to the embodiment is disposed in a room of a building. In the example shown in FIG. 6, the projector 18 is mounted at the upper center side of the main screen MS. The left lighting unit 30 and the right lighting unit 32 are mounted at the upper left and the upper right sides, respectively. A left wall surface, which is one of partitions that define a space containing the main screen MS and the projector 18, is used as the left screen LS disposed in the lighting zone of the left lighting unit 30. Similarly, a right wall surface, which is also one of the partitions that define the space containing the main screen MS and the projector 18, is used as the right screen RS disposed in the lighting zone of the right lighting unit 32. Instead of the wall surfaces, other partitions, such as a floor surface and a ceiling surface, may be used.

Figure 7:
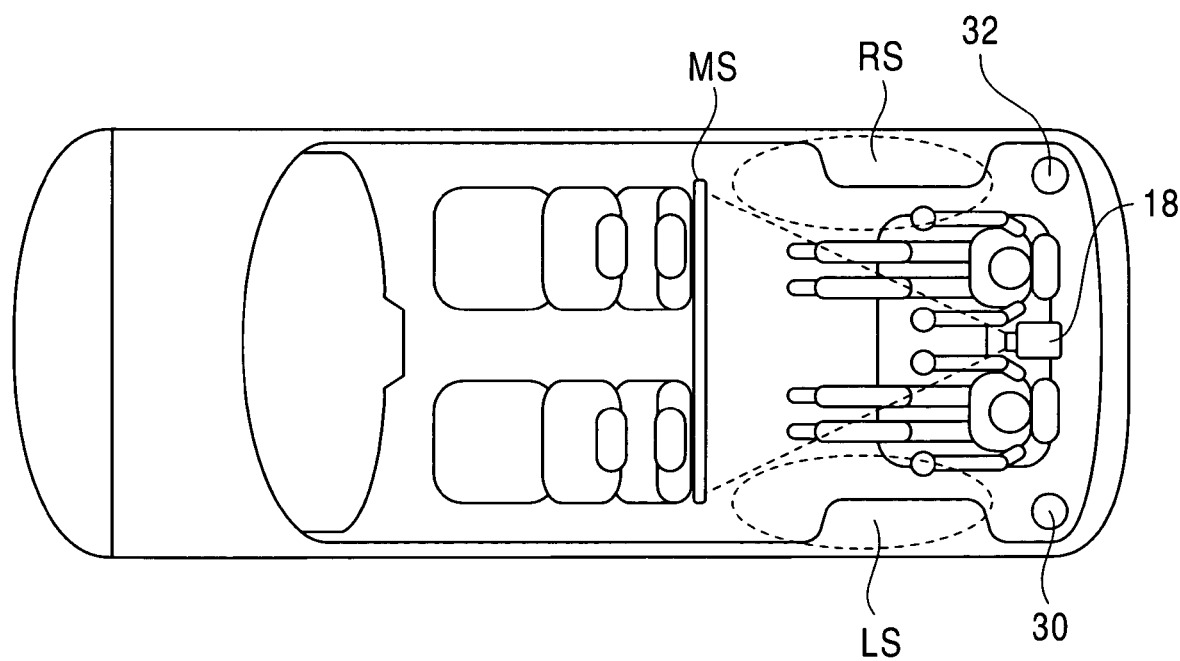
FIG. 7 shows an example in which the video output device according to the embodiment is installed in the interior of a motor vehicle.
Figure 8:
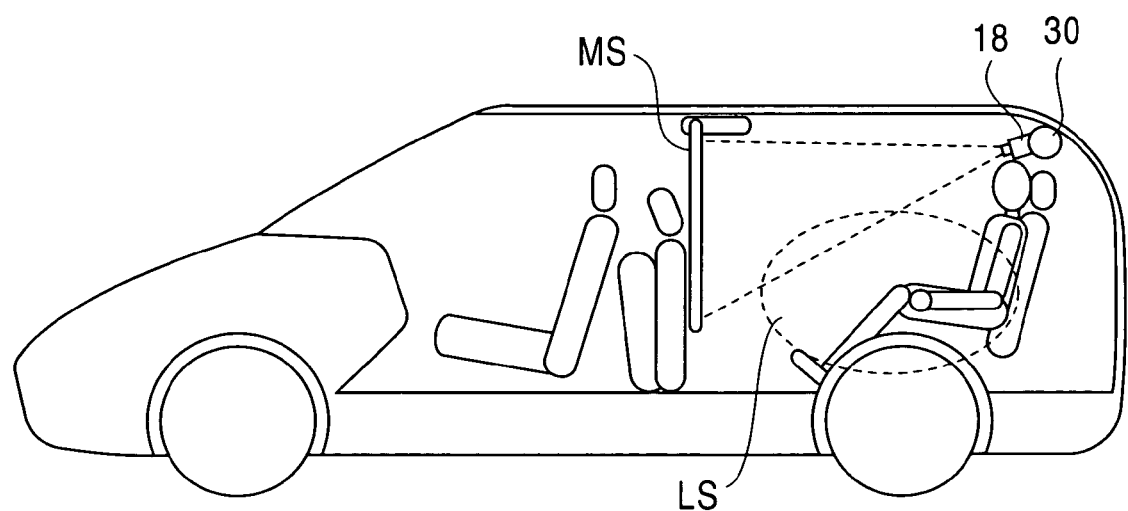
FIG. 8 shows another example in which the video output device according to the embodiment is installed in the interior of a motor vehicle.

FIGS. 7 and 8 show an example in which the video output device according to the embodiment is disposed in the interior of a motor vehicle. As shown in the drawings, the main screen MS is, for example, disposed in front of two passengers in a rear seat, and the projector 18 is disposed in the center rear of the two passengers. Additionally, the left lighting unit 30 is disposed at the left rear of the left passenger, while the right lighting unit 32 is disposed at the right rear of the right passenger. As in the above-described example, the left screen LS and the right screen RS are not prepared in this example. Internal sidewalls or the bulges of the wheel arches of the motor vehicle are used as the auxiliary screens.

Thus, the video output device according to the embodiment displays the video by using the projector 18 and the main screen MS based on the video signals and controls the lighting mode of the left and right lighting units 30 and 32 in synchronization with the displayed timing of the video based on its content. In general, the human eye cannot perceive details of an image if the image is at the sides of the viewing angle range, and only senses the brightness and color of the image as an ambience. Accordingly, by locating the left lighting unit 30 and the right lighting unit 32 on the sides of the main screen MS and controlling the left lighting unit 30 and the right lighting unit 32 in synchronization with the content of the video displayed on the main screen MS, video images having the same sense of presence provided by enlarging the main screen MS can be achieved. That is, the effective video display area of the main screen MS can be reduced and, therefore, the cost is reduced.

In particular, by controlling the left lighting unit 30 and the right lighting unit 32 in synchronization with the content of the frames that constitute the displayed video, a video image corresponding to each frame can provide the same visual effect provided by a larger displayed video image and, therefore, video providing a sense of presence can be achieved.

In addition, by using the left lighting unit 30 and the right lighting unit 32 that define predetermined areas on the left and right sides of the main screen MS as their lighting zones, a sense of presence can be increased in the horizontal direction. In particular, since the viewing angle of the human eye in the horizontal direction is wider that that in the vertical direction, the sense of presence provided by the video can be significantly increased by disposing the lighting zone in the horizontal direction.

The main screen MS is disposed within the normal viewing angle range of an observer of the video, and lighting zones of the left lighting unit 30 and the right lighting unit 32 are disposed outside the normal viewing angle range of the observer. In general, the human eye can perceive details of an image within the normal viewing angle range, whereas the human eye cannot perceive details of the image outside the normal viewing angle range. Accordingly, by replacing the actual image in the unrecognizable zones with lighting from the left and right lighting units 30 and 32, displayed video has a strong visual effect which is the same as that of a bigger main screen MS including the lighting zones.

Almost all lighting zones of the left lighting unit 30 and the right lighting unit 32 are included in the maximum viewing angle range of the observer. The observer cannot even perceive color and brightness outside the maximum viewing angle range. Therefore, eliminating lighting of such zones limits the lighting zone required for increasing the sense of presence, thus reducing the power consumption and size of a facility.

Since the feature extractor 20 analyzes the content of the video corresponding to each frame, and the left-lighting setting unit 22 and the right-lighting setting unit 24 respectively set lighting modes for the left lighting unit 30 and the right lighting unit 32, the appropriate lighting mode for each frame of the video is possible and, therefore, a sense of presence by the video can be increased by the lighting.

The frame is composed of a plurality of areas and the lighting modes of the left lighting unit 30 and the right lighting unit 32 are set up by using the features extracted from these areas. More specifically, the lighting modes of the left lighting unit 30 and the right lighting unit 32 are set up by weighting the features of the individual areas with predetermined values and adding them. This process allows the content of the video corresponding to each frame to be easily analyzed. In particular, an area closer to the left lighting unit 30 or the right lighting unit 32 has a higher weighting factor. Accordingly, the content of the displayed video closer to the lighting zone has more influence on the lighting mode and, therefore, a feeling of strangeness caused by a difference between the displayed video and the lighting in the periphery of the video can be eliminated.

A display timing of a frame of the displayed video is synchronized with a lighting timing of the left and right lighting units 30 and 32 by the timing adjuster 14, which can adjust a difference between the time required for generating a video signal and the time required for analyzing the content of the displayed video and controlling the lighting mode based on the analysis.

If a display device includes the main screen MS and the projector 18, displayed video that supports a big screen is easily achieved. In addition, by adding auxiliary lighting by the left and right lighting units 30 and 32, observers can experience a greater sense of presence than that from the actual screen size. In known devices, a plurality of projectors is required to display video having the same sense of presence. In this display device, however, the number of projectors can be reduced to one since the display area for the video can be reduced. Accordingly, the cost of the display device can be significantly reduced.

As shown in FIG. 6, mounting the left and right lighting units 30 and 32 on a chassis that supports the main screen MS and the projector 18 facilitates the installation operation of the display device.

When the left lighting unit 30 and the right lighting unit 32 are composed of projection light sources capable of changing the RGB ratio, such as high-luminance RGB LEDs or RGB lasers, lighting modes that fit the contents of the video can be easily produced.

Additionally, as shown in FIG. 6, using partitions of a space that includes the main screen MS and the projector 18 for the lighting of the left lighting unit 30 and the right lighting unit 32 eliminates the need for special screens. Accordingly, the display device becomes simple, thus reducing the cost and the installation operation.

As shown in FIG. 1, when the left screen LS and the right screen RS are used as auxiliary screens for the lighting, intended color and brightness by the left and right lighting units 30 and 32 are easily and reliably achieved.

The present invention is not limited to the above-described embodiments; various modifications and variations of the invention will be apparent to those skilled in the art without departing from the scope and spirit of the invention. Although two lighting units are respectively disposed on the sides of the main screen MS in the above-described embodiments, two or more lighting units may be respectively disposed on each side of the main screen MS, or lighting units disposed in the vertical direction may illuminate the periphery of the main screen MS.

In general, an audio device that outputs sound is provided with the above-described video output device. In this case, the left and right speakers of the audio device may respectively include the left and right lighting units 30 and 32. This facilitates the installation of the left and right lighting units 30 and 32, thus facilitating the installation of the entire display device.

Additionally, in the above-described embodiments, the lighting of the left lighting unit 30 and the right lighting unit 32 is carried out at all times while the projector 18 is projecting the video. However, since an observer does not perceive or does not sense the effect of lighting under a certain intensity, the lighting may be carried out only for bright scenes, not for such dark scenes. Thus, by enabling the lighting when the brightness of the video at a predetermined time is over a predetermined value (the feature extractor 20 or, the left-lighting setting unit 22 and the right-lighting setting unit 24 could determine the enable/disable mode), a wasted process and wasted power consumption can be eliminated.

Although luminance data and color data are discussed as features extracted by the feature extractor 20 in the above-described embodiments, the types of features may be changed in accordance with the type of received video signal. For example, when a video signal composed of RGB data is received, R data, G data, and B data could be used as the features.

Although the projection display device including the projector 18 and the main screen MS is discussed in the above-described embodiments, a non-projection display device, such as a plasma display device, may be used. In particular, at the present time, a large-screen plasma display and liquid crystal display device are quite expensive. The present invention provides video images with a sense of presence by using a display device having a relatively small screen and providing a significant cost reduction of a facility.

Furthermore, although the left lighting unit 30 and the right lighting unit 32 that are projection light sources are used in the above-described embodiment, a liquid crystal display or a cathode ray tube (CRT) may be used by emitting light having predetermined luminance and color from the whole body.

What is claimed is:

1. A video output device comprising:
   a video signal generation unit for generating a video signal corresponding to video to be displayed, wherein the video to be displayed is composed of a plurality of temporally successive frames;
   a display unit for displaying the video based on the video signal generated by the video signal generation unit;
   lighting units disposed in the vicinity of the display unit; and
   a lighting control unit for controlling a lighting mode of each lighting unit based on the content of the displayed video in synchronization with the display timing of the video so that a viewer is provided with video images having a sense of presence that is greater than the size of the display unit, wherein the lighting control unit analyzes the content of the video corresponding to each frame, extracts a feature from each of a plurality of areas in the frame, and sets up the lighting mode of the lighting unit by weighting the features in a predetermined manner and adding the weighted features.

2. The video output device according to claim 1, wherein the lighting units define predetermined lighting zones on left and right sides of a display screen of the display unit.

3. The video output device according to claim 1, wherein the weighting is determined such that an area closer to the lighting unit has a higher weighting factor.

4. The video output device according to claim 3, further comprising a timing adjuster for synchronizing a display timing of the video corresponding to one of the frames with a lighting timing of the lighting unit.

5. The video output device according to claim 1, wherein the lighting units define predetermined lighting zones on left and right sides of a display screen of the display unit.

6. The video output device according to claim 5, wherein the display unit has a display screen disposed within the normal viewing angle range of an observer of the displayed video, and the lighting zone of each lighting unit is disposed substantially outside the normal viewing angle range of the observer.

7. The video output device according to claim 6, wherein the lighting zone of each lighting unit is disposed substantially within the maximum viewing angle range of the observer.

8. The video output device according to claim 1, wherein the display unit comprises a screen and a projector.

9. The video output device according to claim 1, wherein the lighting units are mounted on a chassis for supporting the display unit.

10. The video output device according to claim 1, further comprising a speaker for producing sounds corresponding to the content of the displayed video, wherein the lighting units are mounted on a chassis for accommodating the speaker.

11. The video output device according to claim 1, wherein each lighting unit comprises a projection light source capable of changing the RGB ratio in accordance with the displayed video.

12. The video output device according to claim 1, wherein partitions forming a space containing the display unit are disposed around the display unit, and the lighting units emit light to the partitions.

13. The video output device according to claim 1, wherein an auxiliary screen is disposed in an area including the lighting zone of the lighting unit at the periphery of the display unit, and a lighting unit emits light to the auxiliary screen.

14. The video output device according to claim 1, wherein the lighting control unit enables the lighting of the lighting unit when the brightness of the displayed video at a predetermined time is greater than or equal to a predetermined value.

15. A video output device comprising:
a video signal generation unit for generating a video signal corresponding to video to be displayed;
a display unit including a display screen for displaying the video based on the video signal generated by the video signal generation unit, wherein the display screen is disposed within the normal viewing angle range of an observer of the displayed video;
lighting units disposed in the vicinity of the display unit and defining predetermined lighting zones on left and right sides of the display screen, wherein the lighting zone of each lighting unit is disposed substantially outside the normal viewing angle range of the observer;
a lighting control unit for controlling a lighting mode of each lighting unit based on the content of the displayed video in synchronization with the display timing of the video so that a viewer is provided with video images having a sense of presence that is greater than the size of the display unit; and
a timing adjuster connected upstream of at least one of the display unit and the lighting units so as to function as a delay unit for delaying the display timing or the lighting timing, whichever comes first, to synchronize the display timing with the lighting timing.

16. The video output device according to claim 15, wherein the video to be displayed is composed of a plurality of temporally successive frames, and the lighting control unit sets up a lighting mode in accordance with the content of each frame.

17. The video output device according to claim 16, wherein the lighting control unit analyzes the content of the video corresponding to the frame and sets up the lighting mode of the lighting unit.

18. The video output device according to claim 17, wherein the frame comprises a plurality of areas, and the lighting control unit extracts a feature from each area and sets up the lighting mode of the lighting unit by using the features.

19. The video output device according to claim 18, wherein the lighting control unit sets up the lighting mode of the lighting unit by weighting the features in a predetermined manner and adding the weighted features.

20. The video output device according to claim 19, wherein the weighting is determined such that an area closer to the lighting unit has a higher weighting factor.

21. A method for displaying video, comprising:
generating a video signal corresponding to video to be displayed as a plurality of temporally successive frames;
displaying the video based on the video signal with a display unit; and
controlling a lighting mode based on the content of the video to be displayed in synchronization with the display timing of the video to cause a lighting unit to be driven to emit light so that a viewer is provided with video images having a sense of presence that is greater than the size of the display unit;
wherein the act of controlling comprises analyzing the content of the video corresponding to each frame, extracting a feature from each of a plurality of areas in the frame, weighting the features in a predetermined manner, and setting up the lighting mode using the weighted features.

22. The method according to claim 21, wherein the weighting is determined such that an area closer to the lighting unit has a higher weighting factor.

23. The method according to claim 21, wherein a display timing of the video corresponding to a frame is synchronized with a lighting timing of the lighting unit.

24. The method according to claim 21, wherein the display unit has a display screen disposed within the normal viewing angle range of an observer of the displayed video, lighting units define predetermined lighting zones on left and right sides of the display screen, and the lighting zone of each lighting unit is disposed substantially outside the normal viewing angle range and within the maximum viewing angle range of the observer.

25. The method according to claim 21, wherein partitions forming a space containing the display unit are disposed around the display unit, and the lighting unit emits light to the partitions.

26. The method according to claim 21, wherein the lighting of the lighting unit is enabled when the brightness of the displayed video at a predetermined time is greater than or equal to a predetermined value.

* * * * *